(12) United States Patent
Alfonso et al.

(10) Patent No.: US 7,252,786 B2
(45) Date of Patent: Aug. 7, 2007

(54) LONG LASTING THERMOFORMABLE PHOSPHORESCENT ACRYLIC RESIN FOR CASTING, MOLDING, COATINGS, AND ADHESIVES

(75) Inventors: Jorge Leonardo Alfonso, Baltimore, MD (US); Donald Lee Sawyers, Jr., Baltimore, MD (US); Leonard Elbon, Henderson, NV (US)

(73) Assignee: Vistas Group International, Inc., Baltimore, MD (US)

( * ) Notice: Subject to any disclaimer, the term of this patent is extended or adjusted under 35 U.S.C. 154(b) by 270 days.

(21) Appl. No.: 10/924,468

(22) Filed: Aug. 23, 2004

(65) Prior Publication Data

US 2006/0038161 A1 Feb. 23, 2006

(51) Int. Cl.
*C09K 11/02* (2006.01)
(52) U.S. Cl. ................................. 252/301.36
(58) Field of Classification Search ............ 252/301.36
See application file for complete search history.

(56) References Cited

U.S. PATENT DOCUMENTS

| | | | | |
|---|---|---|---|---|
| 5,256,725 A | * | 10/1993 | Eranian et al. ............. | 524/558 |
| 5,607,621 A | * | 3/1997 | Ishihara et al. ......... | 252/301.36 |
| 6,136,226 A | * | 10/2000 | Sakai ..................... | 252/301.35 |
| 6,146,548 A | * | 11/2000 | Sakai ..................... | 252/301.36 |
| 6,309,562 B1 | * | 10/2001 | Sakai et al. ............. | 252/301.36 |
| 6,375,864 B1 | * | 4/2002 | Phillips et al. ......... | 252/301.33 |
| 2003/0173540 A1 | * | 9/2003 | Mortz et al. ........... | 252/301.36 |
| 2004/0137266 A1 | * | 7/2004 | Saito et al. ................. | 428/690 |

FOREIGN PATENT DOCUMENTS

JP 11-130992 * 5/1999

* cited by examiner

*Primary Examiner*—C. Melissa Koslow
(74) *Attorney, Agent, or Firm*—Ober/Kaler; Royal W. Craig

(57) ABSTRACT

Thermoformable, Long Lasting Phosphorescent Acrylic Resin for Castings, Adhesives, Moldings, Coatings and Liquid Inlays are manufactured from thermosetting acrylic syrup, promoters, additives, fillers and phosphorescent pigments and are used to manufacture thermoformed, cast, coated, inlayed, molded articles and reinforced composites. These phosphorescent resins glow-in-the-dark, and exhibit a long lasting, bright glow after exposure to light (photoluminescence). The use of suspending agents keeps the heavy phosphorescent pigments in suspension and results in a phosphorescent resin that has a long shelf life. The Phosphorescent Acrylic Resin compositions disclosed herein may be used in thermoform and thermoset applications to produce solid-surface acrylic resin products with a robust glow-in-the-dark property.

8 Claims, No Drawings

LONG LASTING THERMOFORMABLE PHOSPHORESCENT ACRYLIC RESIN FOR CASTING, MOLDING, COATINGS, AND ADHESIVES

CROSS-REFERENCE TO RELATED APPLICATIONS

The present application derives priority from U.S. provisional application No. 60/499,056, filed 30 Aug. 2003.

BACKGROUND OF THE INVENTION

1. Field of the Invention

The invention consists of a significantly improved long lasting thermoformable phosphorescent acrylic resin blend, filled or unfilled, for casting, molding, coatings, liquid inlays and adhesives. Specifically, the present invention relates to the thermoformable, photoluminescent, thermoluminescent and electroluminescent properties. These polymer composites are characterized by unique, long lasting glow-in-the-dark properties exhibited after being exposed to light. The visual afterglow lasts for 10 hours or more after proper exposure to light.

2. Description of the Background

Products of the general character of acrylic resins as mentioned above are commercially available under many trade names such as Corian, LG Hi-Macs, Lucite, Staron, Formica, etc. Acrylic resin materials have long been known and commonly available for use as kitchen and bathroom surfaces, cubicle dividers and wainscoting, etc. Broadly speaking these materials are formed from thermoset acrylic and or unsaturated polyester resins. Fillers range widely and are used to improve thermal and mechanical properties, impart rigidity, flame retardance and are used to give particular visual effects to the product. Many prior existing patents are directed to these types of products. Examples of those patents include "Filled Polymethylmethacrylate Article and Process for its Manufacture" in Duggins et al. U.S. Pat. No. 3,827,933; "Thick Cured Polymethylmethacrylate Article and Process for its Preparation" in Slocum U.S. Pat. No. RE. 27,093: "Use of Alumina Trihydrate in a Polymethylmethacrylate Article" in Duggins U.S. Pat. No. 3,847,865, these being but a few of the many U.S. patents that exist in this field.

The aforementioned products have experienced tremendous commercial success as surfacing especially for countertops and tabletops in kitchen and bathroom surfaces as well as vertical applications like wall cladding and signage. The said products (broadly termed as Solid Surface), are non-porous, solid materials that are manufactured in a variety of colors and patterns that run throughout the product yielding a soft, translucent warm look. This material is repairable, thermoformable, resistant to heat, impact, fungal and bacterial growth. The material can be easily repaired when damaged (breaks or cracks) and renewed (normal wear, staining, etc.) to its original look:

Pigments commonly used in these products are composed of small particles of inorganic compounds, generally metallic oxides that are approximately spherical in shape. Other pigments, fillers and aggregates (larger pieces of colored material) are used to produce various visual effects. Alumina Trihydrate (ATH) is commonly used filler due to its particular fire retardant properties.

Luminescence has been a long observed natural phenomenon. Heat has long been known to excite and cause liquids and solids to emit shorter wavelengths of light as their temperature increases. Examples of this would be a metal that is increasingly heated proceeding through a red glow until becoming 'white hot'. This phenomenon is commonly referred to as incandescence or a light produced by heat. Incandescence has been a useful method of producing light for many years and includes fire, candles, various types of oil and gas lamps and electrically stimulated bulbs using tungsten as a filament. Electrical current has been well known to cause certain gases like neon to become luminescent.

In contrast there is also a phenomenon of fluorescence/phosphorescence that does not require the application of heat. Fluorescence differs from phosphorescence only in the duration of the afterglow. Fluorescence afterglow is measured in seconds, while phosphorescence is measured in minutes/hours. Examples of naturally occurring 'cold luminescence' (hence termed phosphorescence) include organisms that exhibit bioluminescence, examples of which are foxfire (a fungus-growing on decaying material that produces light), lightning bugs, glow worms and various deep sea denizens. Certain naturally occurring chemicals like phosphorous exhibit a dim glow Other compounds like phosphors for example, are luminescent (phosphorescent) after exposure to sunlight, x-rays or electron beams.

There are many phosphorescent substances including sulfides, silicates, metal aluminum oxides, silicates and rare earth oxides. Zinc sulfides are the most well known phosphorescent pigment. Zinc sulfide can be activated by adding various activators, the most common of which is copper (forming ZnS:Cu). Aluminum, gold, gallium, manganese, indium, scandium, lead, cerium, terbium, europium; gadolinium, samarium, praseodymium or other rare earths and halogens can all be used to activate the zinc sulfide by incorporating into the crystal lattice structure. Other sulfide phosphors include ZnCdS:Cu, ZnCdS:Ag, CaS:Bi, CaSrS:Bi alpha barium zinc sulfides, barium zinc cadmium sulfides, strontium sulfides and others. Various patents describe the use of the aforementioned substances. For example, U.S. Pat. No. 3,595,804 (1971) to Martin, Jr. discusses the method used to improve the zinc sulfide and zinc cadmium sulfide phosphors having aluminum and being activated with silver or copper. U.S. Pat. No. 5,558,817 (1996) to Bredol, et al. explains the method of manufacturing luminescent zinc sulfide activated by copper and aluminum. U.S. Pat. No. 3,970,582 (1976) to Fan, et al. deals with luminescent materials comprising alpha barium zinc sulfides or barium zinc cadmium sulfides activated with cerium, europium, lead, manganese or terbium and their method of manufacture. U.S. Pat. No. 3,957,678 (1976) to Dikhoff, et al. also deals with a method of manufacturing zinc sulfide and or cadmium phosphors.

Aside from the previous patents mentioned, describing the manufacture of the pigments themselves, there are many patents to describe zinc sulfide type phosphorescent pigments and their use specifically in thermoplastic and thermoset applications. Some examples are: U.S. Pat. No. 4,211,813 (1980) to Gravisse, et al. (Photoluminescent textiles using metal sulfides), U.S. Pat. No. 5,692,895 (1997) to Farzine-Nia, et al. (Photoluminescent orthodontic appliances using zinc sulfide with calcium cadmium and strontium), U.S. Pat. No. 5,605,734 (1997) to Yeh, et al. (Phosphorescence carpets with directional signs using copper or zinc sulfide doped with copper and manganese), U.S. Pat. No. 5,674,437 (1997) to Geisel (luminescent fibrous material using metal aluminate oxide pigments with a thermoplastic polymer. The luminescent comprised as a thermoplastic polymer such as polypropylene, polyamides, polyesters, polymethacrylics, polyacrylates, polycarbonates, PVC, polyethylene, acrylic resins, polyurethane, halogenated polymers, etc. U.S. Pat. No. 5,607,621, (1977) to Ishihara, et al. covers making phosphorescent resins and formed articles using zinc sulfide doped with copper and resinous materials such as ABS resins, acrylic, acetals, PET, nylon, PVC, etc.

However, all zinc sulfide derivatives suffer from the problems of being degraded by UV light in the presence of moisture and especially from a relatively short afterglow. These limitations negate the use of zinc sulfide combinations by themselves in any phosphorescent product that requires long lasting afterglow or are exposed to any UV light source.

SUMMARY OF THE INVENTION

The invention consists of numerous improvements over prior art, as well as some novel features, particularly as the invention relates to Solid Surface and other decorative products made from thermosetting acrylic and/or polyester resins commonly available in the marketplace under the names of Acrystone (Aristech Acrylics LLC), Corian (Dupont), LG Hi Macs (LG Chemical Company), Lucite (Lucite International), Staron (Samsung), Formica Solid Surfaces and many others. The invention improvements and novel features are as follows:

Accordingly, it is an object of the present invention to provide an improved phosphorescent thermosetting acrylic blend for use in thermoform and thermoset applications to produce solid-surface acrylic resin products with a robust glow-in-the-dark property.

It is another object to provide phosphorescent thermosetting acrylic products (filled or unfilled) that are thermoformable to a tighter radius than other resins in prior art.

It is another object to provide phosphorescent thermosetting acrylic products that exhibit more flexibility than thermosetting unsaturated polyester materials and comparably produced products.

It is another object to provide a phosphorescent thermosetting acrylic resin that is water resistant (salt water, chlorinated, purified, de-ionized, distilled, well water and potable water), light resistant, and possesses enhanced UV (Ultra Violet) resistance, as well as resistance to fungal and bacterial growth, weather resistant by virtue of their superior mechanical properties (impact, flexural modulus, flexural strength, etc.), flexibility, UV Stability and Color Fastness.

It is another object to provide a phosphorescent thermosetting acrylic resin with inherent compatibility with other complimentary products such as natural stone (granite, marble, etc.), engineered Stone (resin & quartz composites, etc.), hard woods and other solid surfaces.

It is another object to provide a phosphorescent thermosetting acrylic resin that exhibits increased initial afterglow that is 10 times greater than prior art.

It is another object to provide phosphorescent thermosetting acrylic resin that has a long shelf life for long term storage and use.

It is another object to provide phosphorescent thermosetting acrylic resin that is solvent weldable, unlike thermosetting unsaturated polyester resins.

It is another object to provide phosphorescent thermosetting acrylic resin that can be easily joined with structural acrylic adhesives with no need for surface preparation.

Another object of the invention is to provide a process (method) for making very translucent (approaching transparent) to opaque solid surface products for use as sheets, strips, shaped goods, or particles (which can be used as an aggregate or, if desired, can then be ground to produce material that contains "particles within particles" creating a special visual effect.

Another object of the invention is to provide phosphorescent thermosetting acrylic resin products that are renewable and repairable after being scuffed, scratched, cracked or broken. Solid surface products produced in accordance with the invention can be easily renewed by using a Scotchbrite™ pad or light sanding. If a piece is broken off, it can be fixed (re-attached) by the use of the thermoformable, long lasting, acrylic glow-in-the-dark color dually matched adhesive which results in an inconspicuous (visually indiscernible) repair. This is an improvement over prior art since this invention provides inconspicuous 'joining' (seaming) when viewed in both light and dark settings. Solid surface products produced in accordance with the invention can be easily renewed by using a Scotchbrite™ pad or light sanding.

DETAILED DESCRIPTION OF THE PREFERRED EMBODIMENT

The present invention is a class of long-lasting phosphorescent thermoformable acrylic resin blends, filled or unfilled, for casting, molding, coatings, liquid inlays, adhesives and the like. The resulting blend may be used in thermoform and thermoset applications to produce solid-surface acrylic resin products with a robust glow-in-the-dark property (characterized by unique, long lasting . . . 10 hours or more . . . glow-in-the-dark properties exhibited after being exposed to light.

The compositions generally comprise quantities of Polymethylmethacrylate (PMMA) and Methylmethacrylate (MMA), an antioxidant, air release agent, fumed silica, and phosphorescent pigments in the nature of aluminate oxides. The compositions are mixed according to a particular blending process under high shear. The resulting resin compositions are rendered thixotropic by the addition of the fumed silica which keeps the heavier phosphorescent pigments in suspension. Optional suspending agents, crosslinkers, colorizers, UV absorbers, UV quenchers/scavengers, catalysts (including cure catalysts, and promoters may be added as desired to modify the end product as desired.

The compositions specifically comprise quantities of constituents in conformance with the following Table:

| Constituent | Name | Preferred Weight % | Acceptable Range |
|---|---|---|---|
| Polymethyl-methacrylate | PMMA | 27.9% | 9.74-27.9% |
| Methylmethacrylate | MMA | 67.9% | 8-77.76% |
| Unsaturated polyester resin | | 40% | 0-40% |
| Fumed silica | Silicon Dioxide | 1% | 1-10% |
| Filler | Alumina tri-hydrate (ATH) | | 0-60% |
| Suspending Agent | Modified Urea | | 0.2-0.5% |
| | Anionic, unsaturated polycarboxylic acid polymer | | 0.5-1.0% |
| Crosslinkers | Multifunctional acrylates | 0.1-1.0% | 0-10% |
| Phosphorescent pigments | Aluminate | 1-10% | 1-50% |
| Colorizer | standard pigment | | 0-5% |
| UV absorbers | benzophenones | | 0.05-2.00% |
| Air release agents | modified urea | 0.1-0.5% | 0.1-1% |

-continued

| Constituent | Name | Preferred Weight % | Acceptable Range |
|---|---|---|---|
| Cure catalyst | tertiary butyl monoperoxy maleate (PMA) | 1.0% | 0.1-1.0% |
| Promoter | Water, calcium hydroxide, mercapatans, thiols and other sulfur containing compounds | 0.2% | 0.5-1.0% |
| Antioxidants | hydroquinone (MEHQ or HQMME) | 0.25% | 0-0.25% |

Each of the above-referenced constituents will now be described in more detail.

The preferred long lasting phosphorescent pigments are alkaline earth metal aluminate oxides (for example, Strontium Diluminate activated by Europium) because of the intense afterglow (10 times that of zinc sulfide derivatives) and greater duration of glow (greater than 10 hours as opposed to minutes with zinc sulfide derivatives). The alkaline earth metal aluminate oxides come in various colors of glow (green, blue green, aquamarine, and plum). In addition, the alkaline earth metal aluminate oxides have better weatherability, because they are not degraded by UV light, however they are expensive. Zinc sulfide phosphors are less expensive and can be used in conjunction with alkaline earth aluminate oxides to reduce cost, but at the loss of glow properties. Henceforth, it is understood that the term "phosphorescent pigment" can mean metal alkaline earth aluminate oxides or mixtures of primarily alkaline earth aluminate oxides with some activated zinc sulfides.

Phosphorescent pigment concentrations exceeding 50% by weight of the total compositions are possible. However, due to the high cost, phosphorescent pigment concentrations within a range of from 1-10% by weight of total composition are preferred.

Additional color pigments may be used for color-tinting. High concentrations of pigments (especially Titanium Dioxide) are not desirable as they result in increased opacity and reduced phosphorescence. Additional pigments can include standard inorganic type pigments like metal oxides, lake pigments, pearlescent pigments (metallic oxide coated mica), metallic pigments etc. Color tint pigment concentrations within a range of from 0-5% are optimal.

The above-described phosphorescent pigments are very dense (3.5 g/ml or more) and settle out quickly. Therefore, the present compositions include a transparent or translucent acrylic polymer resin having a useable shelf life, and optional suspending agents and/or fillers that eliminate settling.

A variety of suitable fillers are described below. In applications where a transparent product is desired, fillers cannot be used as they result in articles that are translucent (semi-opaque) or opaque. When very translucent (approaching transparent) articles are desired; suspending agents such as modified Urea (0.2-0.5% by weight being the optimal level) or an anionic, unsaturated polycarboxylic acid polymer (0.5-1.0% by weight being the optimal level) may be used.

Alumina tri-hydrate (ATH) is the preferred filler, especially for solid surface applications, and also provides flame retardancy. Magnesium hydroxide however results in a less than satisfactory color. Very high loadings of ATH and other fillers (greater than 60%) cause a reduction in phosphorescence due to increased opacity. Consequently, an amount of ATH in the range of 18-25 microns is the most desirable and results in articles with better phosphorescence. Even though ATH and other fillers reduce the settling of the phosphorescent pigment, eventually the ATH will also settle out.

It is convenient to use fumed silica (Silicon Dioxide), or liquid anti settling additives such as anionic, unsaturated polycarboxylic acid polymer, or a methyl methacrylate/dimethylamino ethyl acrylate that is especially effective in keeping ATH suspended in acrylic resin. 1% of the latter liquid additive is found to be optimal for ATH suspension.

Additional flame retardant additives can be added such as antimony oxides, zinc borates, phosphate esters etc. to increase flame retardancy. Magnesium carbonate can be incorporated to the formulation as a smoke suppressant.

When the appropriate filler, an opaque product can be produced using thixotropic agents like fumed silica and bentonite clays (1-10% by weight), and fillers such as ATH (Alumina Trihydrate); calcium carbonate, magnesium hydroxide, titanium dioxide, silica, mica, feldspar, glass microspheres, wollastonite, barium sulfate and various other sulfates. Wollastonite is useful as this mineral has an aspect ratio (is a mineral fiber) and provides reinforcement. Mica (being a plate structure) also provides reinforcement but along a plane instead of in a uniaxial direction. Fillers in general result in articles of increased hardness, stiffness, strength, impact resistance, light resistance and heat resistance to the polymers they are used in. High loadings of filler reduce the settling of the heavy phosphorescent pigment. Surface modified fillers (generally modified with silanes) can also impart greater strength, stiffness, blush resistance and impact resistance than the untreated or unmodified filler alone.

In addition to the anti-settling benefits, fillers have the additional benefits of reducing cost, exotherm, thermal expansion, crazing and shrinkage.

In use, UV energy is the most effective in charging these phosphorescent polymers. Sources containing higher levels of UV energy like sunlight, blacklights and cool white fluorescents all take less time to charge these phosphorescent polymers. Incandescent and sodium vapor sources are less effective and take longer times to charge.

UV absorbers are another class of additives often added to polymer compounds for increased weathering. This is especially important in phosphorescent polymers containing zinc sulfides, which are prone to degradation by UV light. UV absorbers work by absorbing the UV light before the surrounding polymer, and then emitting the energy as Infrared light (heat). If UV absorbers are to be added, they are usually benzophenones such as 2,4-dihydroxy benzophenone, benzoates, salicylates, triazines and triazoles.

UV quenchers and UV scavengers (generally hindered amines) can also be used to protect polymer systems and zinc sulfides from UV degradation.

In light of the aforementioned drawbacks of the UV additives (cost and efficacy) the preferred polymer used in the invention is an acrylic polymer. Acrylic polymers are inherently more stable in the presence of UV. Acrylic resins containing the long lasting, phosphorescent alkaline earth aluminate oxides do not need UV absorbers, although they may be added if desired. If mixtures of acrylic and unsaturated polyester resins are used to make a long lasting phosphorescent polymer, UV absorbers are needed to prevent unsaturated polyester degradation by UV, but at the risk of affecting visible color. Levels of UV absorbers fall in the range of 0.05-2.00%.

Unsaturated polyester resin can be added to the acrylic resin in proportions up to 40% by weight of the thermosetting resin portion for cost reduction. Although any unsaturated polyester can be used for solid surface application, an ISO-NPG (isophthalic acid/neo-pentyl glycol) resin is preferred. By maintaining at least 60% of the thermosetting acrylic resin portion, it provides toughness, ductility, thermoformability and the ability to be seamed or joined by structural acrylic adhesives without abrading the joint interface.

To improve prior art, crosslinkers were added to the invention. The most useful crosslinkers are multifunctional acrylates, a few examples of which are trimethylol propane trimethacrylate and ethylene glycol dimethacrylate. Crosslinkers impart stiffness, strength, chemical and weather resistance. Crosslinkers may be added in amounts up to 10% weight when making aggregates to prevent the acrylic aggregates from swelling when placed in acrylic resins. For specific applications no crosslinker is added if flexibility is desired. A level of 0.1-1.0% (based on resin weight) of each crosslinker has been found optimal for solid surface sheet good applications (other than aggregates). Another improvement over prior art is the use of optical brighteners and whiteners to improve the brightness and reflectivity of the thermoformable, phosphorescent acrylic resin.

Air release agents are used to coalesce air causing it to rise to the top of the mixture and release to the atmosphere in order to make a part that is not porous. There are many air release additives for different thermoset products. The air release of choice for acrylic application is modified urea. These deaerating agents can be added in amounts up to 1% by resin weight although 0.1-0.5% is optimal.

Catalyst for these applications are organic peroxides. Ambient cure catalysts include benzoyl peroxide and dibenzoyl peroxide. Ranges of benzoyl peroxide for hardening fall in the range of 0.2-0.8% by weight. While cheap and safe they are known to cause polymer yellowing. The room temperature cure catalyst of choice is tertiary butyl monoperoxy maleate (PMA). Ranges of PMA for hardening are 0.1-1.0% based upon total weight. Acrylic polymer systems are very flexible with respect to cure and many heat assisted peroxide systems can be used. Examples of which are many including peroxydicarbonates and catalysts that kick off at higher temperatures like tert-butyl peroxybenzoate. Peroxydicarbonates are heat assisted peroxide curing agents (catalysts): Di(4-ter-butyl-cyclohexyl)peroxydicarbonate being the peroxydicarbonate of choice due to their affinity for both acrylics and polyesters, and non limiting storage conditions (i.e. peroxydicarbonates can be shipped and stored under 70.degree. F.). Binary and tertiary combinations of these catalysts are often found useful for a stepped cure (ambient or heat assisted). For example, if a heat assisted cure is desired, a mixture of 15% di-(4-tert-butyl-cyclohexyl)peroxydicarbonate, 20% Tert butyl peroxy isopropyl carbonate and 65% MMA can be added at a level of 1% (based upon total weight) and mixed well for several minutes under vacuum. The mixture is then poured in a mold and heated in an oven at 180.degree. F. Mixture hardens in 1 hour or less whereupon it is removed and cooled.

Promoters for acrylic systems are especially important in room temperature or ambient applications. Water (a known thickener for acrylic systems), calcium hydroxide, mercapatans, thiols and other sulfur containing compounds like ammonium bisulfite all act as promoters for ambient acrylic cure. Promoters and accelerators are used sparingly to prevent high exotherms and monomer boil off. A 60% aqueous solution of Ammonium bisulfite is effective at levels as low as 0.002% with a 0.008% (based on liquid weight) level as optimal. Calcium hydroxide levels of 0.25-1.00% are the most effective. Other organic sulfur containing compounds like mercapatans, operate within the ranges 0.1-0.7% (total weight). For adhesive applications that need a faster cure, amines like dimethyl para toluidine can be employed. Or if a slower cure, with better coloring is desired, N,N-bis-2-hydroxypropyl)-p-toluidine can be used. Depending upon the length of cure, desired levels of 0.5-1.0% by total weight may be used with 0.2% as optimal. Although they provide a fast cure, the amines are known to cause yellowing in the polymer. Adhesive lines are generally so thin that this is not a problem. All of these acrylic promoter systems have the added advantage that they do not "mute" the phosphorescent effect like ambient cure unsaturated polyester promoters such as cobalt octoate, etc.

Antioxidants, generally hydroquinones like MEHQ or HQMME (mono methyl ether of hydroquinone) are useful as they inhibit polymerization of the phosphorescent acrylic resins prior to catalyzing, giving the thermoset phosphorescent thermoset resin systems a longer shelf life. Levels of approximately ¼% (0.25%) are optimal for long term storage.

The compositions are formed according to a particular blending process under high shear detailed below in the following examples.

EXAMPLE #1

Basic Unfilled Formulation

Thermoformable, Long Lasting Phosphorescent Acrylic Resin for translucent applications.

| Ingredients by Sequence of Addition | Percent by Weight |
| --- | --- |
| Methylmethacrylate (MMA) | 67.900 |
| PMMA (Polymer) | 27.900 |
| 10% HQMME in MMA (w:w) | 0.200 |
| Air Release Agent | 0.500 |
| Fumed Silica | 1.000 |
| Long lasting Phosphorescent (Aluminate) Pigment | 2.500 |

Procedure: In the above examples, shear PMMA into MMA at room temperature making sure the PMMA is completely dissolved. Add antioxidant (HQMME in MMA), air release agent, fumed silica and phosphorescent pigment and mix under high shear. The resulting resin is rendered thixotropic by the addition of fumed silica which keeps the heavier phosphorescent pigment in suspension.

EXAMPLE #2A

Filled Formulation Using Aluminum Trihydrate as Filler

Thermoformable, Long Lasting Phosphorescent Acrylic Resin for opaque applications (for example, solid surface products).

| Ingredients by Sequence of Addition | Percent by Weight |
| --- | --- |
| Basic Unfilled Formulation from Example # 1 | 32.050 |
| Methylmethacrylate | 8.000 |
| Internal Mold Release | 0.400 |
| Air Release Agent | 0.350 |
| Long lasting Phosphorescent (Aluminate) Pigment | 3.200 |
| Aluminum Trihydrate (ATH) | 56.000 |

Procedure: Follow the making of example # 1 for the portion of this formulation, then add Methylmethacrylate (MMA), internal mold release, and air release agent. Mix well. Follow with the addition of the Phosphorescent pigment and mix well. Caution—Do not over shear. Finally, add the ATH and mix well under high vacuum.

EXAMPLE #2B

Filled Formulation Using Calcium Carbonate as Filler

Thermoformable, Long Lasting Acrylic Resin for opaque applications

| Ingredients by Sequence of Addition | Percent by Weight |
| --- | --- |
| Basic Unfilled Formulation from Example # 1 | 30.067 |
| Methylmethacrylate | 7.800 |
| Trimethylol propane trimethacrylate | 0.300 |
| Ethylene Glycol Dimethacrylate | 0.100 |
| Ammonium bisulfite (60% aq.) | 0.003 |
| De-ionized Water | 0.080 |
| Internal Mold Release | 0.200 |
| Calcium Hydroxide (lime water) | 0.200 |
| Long Lasting Phosphorescent (Aluminate) Pigment | 1.250 |
| Calcium Carbonate | 60.000 |

Procedure: Follow the making of example #1 for the portion of this formulation, and then add the remaining liquids components (Trimethylol propane trimethacrylate, Ethylene Glycol Dimethacrylate, Ammonium bisulfite, and De-ionized Water) as per formulation. Mix well. Then, follow by adding internal mold release and calcium hydroxide, and mix well. Add the Long Lasting Phosphorescent (Aluminate) Pigment and mix well. Finally, add the calcium carbonate. Under vacuum, mix well.

To cure, add 0.96% of a 0.2% solution of tertiary butyl monoperoxy maleate/MMA (w:w) and mix under vacuum for 2 minutes, then pour into mold, cast on belt, etc. Mixture hardens into a translucent sheet within 1-1.5 hrs. Note: The use of calcium carbonate as a filler is for cost reduction and its weight percent is variable as a matter of design choice.

EXAMPLE #3

Adhesive Formulation

Thermoformable, Long Lasting Phosphorescent Acrylic Resin for structural adhesive applications.

| Ingredients by Sequence of Addition | Percent by Weight |
| --- | --- |
| Methylmethacrylate (MMA) | 77.760 |
| PMMA (Polymer) | 9.740 |
| 10% HQMME in MMA (w:w) | 0.200 |
| Air Release Agent | 0.500 |
| Ethylene Glycol Dimethacrylate | 7.600 |
| Mercapatan | 0.500 |
| DMPT (N,N Dimethyl p-toluidine) | 0.200 |
| Fumed Silica | 1.000 |
| Long lasting Phosphorescent (Aluminate) Pigment | 2.500 |

Procedure: Mix the initial seven liquid ingredients well. Follow by adding the Fumed Silica and remixing until it is dissolved. Lastly, add the long lasting phosphorescent (aluminate) pigment and mix well. Apply vacuum at a minimum of 25 inches of mercury for 10 minutes. Note: This adhesive is promoted with an amine (DMPT or Dimethyl para toluidine) which allows a room temperature cure when promoted with 0.5% of a 50% solution of benzoyl peroxide.

Amines are generally not suitable for production of sheet goods as they tend to produce a yellow color. The adhesive "glue line" is generally 0.002 inches thick. The amine promotion can be used because the yellow color cannot be perceived in a glue line that thin.

EXAMPLE #4

Basic Formulation for Thermoformable, Long Lasting Phosphorescent Acrylic Resin using Commercially Available Acrylic Resin

| Ingredients by Sequence of Addition | Percent by Weight |
| --- | --- |
| Commercial Acrylic Resin (Thermoset Acrylic and/ or unsaturated polyester resins) | 94.800 |
| Air release agent | 0.500 |
| Diluted Zinc Sulfide (70%) | 1.000 |
| Diluted Titanium Dioxide (70%) | 0.500 |
| Fumed Silica | 1.200 |
| Long Lasting Phosphorescent (Aluminate) Pigment | 2.000 |

Procedure: Mix the initial four liquid ingredients well. Follow by adding Fumed Silica and mix until dissolved. Lastly, add the phosphorescent pigment and mix under high shear. The resulting resin is rendered thixotropic by the addition of fumed silica which keeps the heavier phosphorescent and standard pigments in suspension. Note: Because the standard commercial resin is already inhibited, the addition of HQMME is not needed.

The above-described composition can be produced in a novel liquid inlay form as follows: Mix a commercially available methylmethacrylate resin, an acrylic ester as an air release agent, a thixotropic agent (modified urea), and alkaline earth metal type Aluminate phosphors and a mineral filler. This liquid inlay will use an activator (catalyst) of Benzoyl Peroxide in a dispensed ratio (10:1) rendering the liquid inlay solid in thirty minutes. This is an economical alternative to casting, molding or thermoforming.

The liquid inlay can be applied utilizing a two part cartridge system similar to adhesive systems used by Solid Surface and Engineered Stone fabricators, carpenters, stone masons, etc. The advantage of this dispensing mechanism/system is that it eliminates the common problem of air entrapment that exists in unsaturated polyester, epoxy and other systems. Furthermore, it minimizes shrinkage after curing which is another problem encountered with inlays made from unsaturated polyester, epoxy, etc.

EXAMPLE #5

Formulation for Thermoformable, Long Lasting Phosphorescent Acrylic Resin for Use in Unfilled Structural Panels

| Ingredients by Sequence of Addition | Percent by Weight |
| --- | --- |
| Thermoformable, Long Lasting Phosphorescent Acrylic Resin Formulation either from Examples #1 or #4 | 30.187 78.392 |
| Methylmethacrylate (MMA) | 19.600 |
| Trimethylol propane trimethacrylate | 0.700 |
| Ethylene Glycol Dimethacylate | 0.300 |
| Ammonium bisulfite (60% aq.) | 0.008 |
| De-ionized Water | 0.200 |

-continued

| Ingredients by Sequence of Addition | Percent by Weight |
|---|---|
| Internal Mold Release (e.g. Zelec UN) | 0.400 |
| Ca(OH)$_2$ | 0.400 |

Procedure: Under high shear, mix the initial six liquid ingredients well. Follow, by adding the internal mold release and mix well. Lastly, add the Ca(OH)$_2$ and mix well under high shear. Note: If a clear sheet is desired, eliminate the opaque (ZnS and TiO$_2$). The formulation of example #5 will yield increased physical properties such as stains, strength, light and heat resistance. This is due to the addition of the crosslinkers.

For an autogenic cure (room temperature), promoters are required. Add 2.0-2.5% (by total weight) of a 0.20% solution consisting of tertiary butyl monoperoxy maleate in MMA (w:w). Mix under vacuum for two minutes (note: do not mix longer in order to avoid drawing of MMA monomer). The mixture is then ready to be poured into a mold or cast onto a belt, etc. The mixture will harden into a translucent sheet within 1.0-1.5 hrs.

EXAMPLE #6

Formulation for the Thermoformable, Long Lasting Acrylic Aggregates (For example: To be used as aggregates).

| Ingredients by Sequence of Addition | Percent by Weight |
|---|---|
| Thermoformable, Long Lasting Phosphorescent Acrylic Resin (formulation in example #1 or #4) | 30.187 |
| Methylmethacrylate | 7.700 |
| Trimethylol propane trimethacrylate | 2.300 |
| Ethylene Glycol Dimethacrylate | 0.100 |
| Ammonium bisulfite (60% aq.) | 0.003 |
| De-ionized Water | 0.080 |
| Internal Mold Release | 0.200 |
| Ca(OH)$_2$ | 0.200 |
| Long Lasting Phosphorescent (Aluminate) Pigment | 1.230 |
| Aluminum Trihydrate | 58.000 |

Procedure: Under high shear, mix all the initial six liquid ingredients well. Follow, by adding the internal mold release and mix well. Next, add the Ca(OH)$_2$ and mix well under high shear. Follow with the Long Lasting Phosphorescent (Aluminate) Pigment. Mix well with low shear. Finally, add the Aluminum Hydrate under vacuum and high shear. To cure, add 1.0% of a 0.2% solution of tertiary butyl monoperoxy maleate/MMA (w:w) and mix under vacuum for 2 minutes. Pour into mold, cast on belt, etc. Mixture hardens in 1.5-2.0 hrs. when cast approximately ½ inch thick into an open mold at room temperature. Note: This example shows that the resulting panel can be ground into aggregates by various means and classified into aggregates of various sizes. For example, the panel can be run through a hammer mill, then through a 2 roll grinder. After that, the material can be placed in an air sieve (to pull off any dust or fine materials) and classified into various size aggregates by capturing the resulting material on the appropriate sized screens. The aggregate obtained can be used to make another panel that contains luminescent aggregates. If the resulting panel is to be used for aggregate, it has been found that increasing the TMPTA level to 60 grams (or more) results in aggregate which is better in performance for aggregate. It has been found that failure to do this, results in aggregate swelling from the acrylic monomer (MMA) present in the panel formulation.

EXAMPLE #7

Formulation for Thermoformable, Long Lasting Phosphorescent Acrylic Sheets Containing Thermoformable, Long Lasting Phosphorescent Aggregates of Same or Different Colors

| Ingredients by Sequence of Addition | Percent by Weight |
|---|---|
| Methylmethacrylate (MMA) | 23.300 |
| PMMA | 11.000 |
| 10% HQMME in MMA (w:w) | 0.200 |
| Air Release Agent | 0.500 |
| Fumed Silica | 1.000 |
| Long Lasting Phosphorescent (Aluminate) | 4.000 |
| Pigment (Blue or Green Afterglow) Aluminum Trihydrate | 50.000 |
| Thermoformable, Long Lasting Phosphorescent Aggregates | 10.000 |

(Blue or Green Afterglow or standard colors or a mixture thereof)

Breakdown by cut of Thermoformable, Long Lasting Phosphorescent Aggregates:

CUT (Screen Size):

| | |
|---|---|
| 3-4 Tyler Mesh | 5.000% |
| 5-6 Tyler Mesh | 3.000% |
| 6-7 Tyler Mesh | 2.000% |

Note:
Aggregate combinations are limitless. This is only an example.

Combine all above ingredients (chemical components and Thermoformable, Long Lasting Phosphorescent Acrylic Aggregates by screen size) into a mixer and mix well. Add 1.0% of a 0.2% solution (tertiary butyl monoperoxy maleate/MMA (w:w) and mix under vacuum for 2 minutes. Pour into mold, or cast onto a belt, etc. The mixture hardens in 1.5-2.0 hrs. when cast approximately ½ inch thick into an open mold at room temperature. The resulting panel has aggregate that glow in the dark as well as the background. If the long lasting phosphorescent pigment is eliminated from the background in the above formulation, then there are aggregates that glow on an opaque background. The aggregates can be color matched to the surrounding sheet by the addition of pigment so the aggregates cannot be seen in the daylight because they are the same color as the background sheet, but they appear (glow) in the dark. If the glow in the dark aggregates are one color and the glowing background is another color, then it is possible to have the sheet exhibit one color that glows in the dark, while the aggregates exhibit another color.

EXAMPLE #8

Formulation for Gel Coat

| Ingredients by Sequence of Addition | Percent by Weight |
|---|---|
| Methylmethacrylic (MMA) | 60.33 |
| Hollow glass microspheres | 10.000 |

-continued

| Ingredients by Sequence of Addition | Percent by Weight |
|---|---|
| PMMA (Polymer) | 24.97 |
| DMPT | 0.500 |
| 10% HQMME in MMA (w:w) | 0.200 |
| Air Release Agent | 0.500 |
| Fumed Silica | 1.000 |
| Long lasting Phosphorescent (Aluminate) Pigment | 2.500 |

Procedure: Mix all ingredients well. The above formulation is catalyzed with 0.5% of a 50% solution of BPO (based upon resin weight) and is suitable for spraying. For a smoother flow coat (for brushing or rolling), add additional MMA as needed for thinning.

EXAMPLE #9

Formulation for Blending with 50% Unsaturated Polyester Blend

| Ingredients by Sequence of Addition | Percent by Weight |
|---|---|
| Long Lasting Phosphorescent Polyester Blend | 50.00 |
| Breakdown of Polyester Blend: | |
| Unsaturated Polyester Resin | 31.80% |
| MMA | 8.00% |
| TiO$_2$ Color Concentrate (65%) | 0.20% |
| Long Lasting Phosphorescent Pig. | 4.00% |
| Aluminum Trihydrate | 56.00% |
| Thermoformable, Long Lasting Phosphorescent Acrylic Blend | 50.00 |
| Breakdown of Acrylic Blend: | |
| Commercial Acrylic Resin (Thermoset Acrylic and/or unsaturated polyester resins) | 31.80% |
| Methylmethacrylic (MMA) | 8.00% |
| TiO$_2$ CC (65%) | 0.20% |
| Long Lasting Phosphorescent Pig. | 4.00% |
| Aluminum Trihydrate | 56.00% |

Procedure: In order to maximize miscibility, each blend must be prepared separately and then mixed at a 50/50 ratio. Mix under high vacuum and high shear for 10-15 minutes. The mixture can be used in place of the thermoset acrylic phosphorescent resins listed previously and subsequently can be catalyzed and used for any of the listed applications. This blended system may be cured by BPO in the presence of amines, or using the promoted (adding calcium hydroxide, sulfur compound, PMA catalyst system listed in previous examples) or by a heat assisted cure by using (adding) a solution of 15% peroxydicarbonate, 20% tert-butylperoxy isopropyl carbonate (if desired for residual monomer reduction) and 65% MMA. Use at a level of 2.5% based on thermosetting acrylic resin weight and cure in an oven at 180 F. for 1.0-1.5 hrs.

EXAMPLE #10

Formulation for Making Thermoformable, Long Lasting, Phosphorescent Liquid Acrylic Inlay

| Ingredients by Sequence of Addition | Percent by Weight |
|---|---|
| Methylmethacrylic (MMA) | 9.50 |
| Commercially available acrylic adhesive (Thermoset Acrylic and/or unsaturated polyester resins) | 32.00 |

-continued

| Ingredients by Sequence of Addition | Percent by Weight |
|---|---|
| TiO$_2$ Color Concentrate (65%) | 0.20 |
| Air release agent | 0.50 |
| Long Lasting Phosphorescent Pigment | 8.00 |
| Aluminum Trihydrate | 49.30 |
| Suspension agent | 0.50 |

Procedure: In a planetary mixer, mix the first four ingredients at high speed for five minutes with no vacuum. Add phosphorescent pigment, set vacuum to 24" and mix for five minutes for high speed. Stop vacuum, scrape the blades, check for air, dispersion, etc. Close the mixer, start the vacuum (24" min.), set at high speed and mix for five minutes. Stop the vacuum and open the mixer and add the Aluminum Trihydrate. With vacuum at 24" minimum, mix again at high speed for five minutes. Stop the vacuum, check for air, dispersion, etc. Mix for another five minutes at high speed with vacuum at 24" minimum. Finally, stop the vacuum, check for air, dispersion, etc. Add the suspension agent, close the mixer and after reaching 24" vacuum minimum, mix for five minutes. The product is now finished.

Usage of the Invention:

Due to the invention's unique properties as aforementioned, it can be used in a myriad of areas and applications. Some examples are:

Commercial and residential construction: Baseboard moldings, door trims, signage, chair rail moldings, stair risers—all as low level emergency lighting in the event of a power failure.

Entertainment: For design and theatrical effects in casinos, bars, nightclubs in addition to the low level emergency lighting feature.

Health Care: For low level emergency lighting in hospitals, nursing homes, assisted living centers. In addition, as night time lighting.

Whimsical: Novelty items, toys, ornaments, etc.

Miscellaneous: Adhesives, molded and cast articles such as soap dishes, ashtrays, switch plates, etc.

With the design flexibility and unique properties of this invention, the potential for applications are limitless.

We claim:

1. A thermoformable, phosphorescent acrylic resin composition comprising:
   Polymethylmethacrylate (PMMA);
   Methylmethacrylate (MMA);
   an antioxidant;
   an air release agent;
   fumed silica; and
   alkaline earth metal phosphorescent aluminate oxide pigment;
   said composition being blended under high shear, and rendered thixotropic by said fumed silica to maintain said alkaline earth metal phosphorescent aluminate oxide pigment in suspension, whereby said composition is suited for use in thermoform and thermoset solid-surface acrylic resin products with a glow-in-the-dark property.

2. The thermoformable, phosphorescent acrylic resin composition according to claim 1, wherein said antioxidant is mono methyl ether of hydroquinone (HQMME).

3. The thermoformable, phosphorescent acrylic resin composition according to claim 1, wherein said air release agent comprises between 0.1-0.5 weight percent of said thermoformable, phosphorescent acrylic resin composition.

4. The thermoformable, phosphorescent acrylic resin composition according to claim 1, wherein said air release agent comprises modified urea.

5. The thermoformable, phosphorescent acrylic resin composition according to claim 1, formed by mixing said PMMA into said MMA at room temperature until said PMMA is dissolved, adding said antioxidant, air release agent, fumed silica and alkaline earth metal phosphorescent aluminate oxide pigment, and mixing under high shear to form a thixotropic resin in which said alkaline earth metal phosphorescent aluminate oxide pigment remains in suspension.

6. A thermoformable, phosphorescent acrylic resin composition comprising:
   Methylmethacrylate (MMA) within a range of from 8-77.76 weight percent;
   Polymethylmethacrylate (PMMA) within a range of from 9.74-27.9 weight percent;
   an air release agent within a range of from 0.1-0.5 weight percent;
   fumed silica of approximately 1 weight percent;
   antioxidant comprising mono methyl ether of hydroquinone (HQMME) of approximately 0.25%; and
   alkaline earth metal phosphorescent aluminate oxide pigment within a range of from 1-10 weight percent;
   said thermoformable, phosphorescent acrylic resin composition being formed by mixing said PMMA into said MMA at room temperature until said PMMA is dissolved, adding said antioxidant, air release agent, fumed silica and phosphorescent aluminate pigment, and mixing under high shear to form a thixotropic resin in which said phosphorescent aluminate pigment remains in suspension, whereby said composition is suited for use in thermoform and thermoset solid-surface acrylic resin products with a glow-in-the-dark property.

7. A thermoformable, phosphorescent acrylic resin composition comprising:
   methylmethacrylate (MMA) within a range of from 8-77.76 weight percent;
   polymethylmethacrylate (PMMA) within a range of from 9.74-27.9 weight percent;
   an air release agent comprises between 0.1-0.5 weight percent of said thermoformable, phosphorescent acrylic resin composition;
   fumed silica of approximately 1 weight percent;
   antioxidant comprising mono methyl ether of hydroquinone (HQMME) of approximately 0.25%; and
   alkaline earth metal phosphorescent aluminate oxide pigment within a range of from 1-10 weight percent;
   said PMMA, MMA and HQMME collectively comprises approximately 94.800 weight percent of said thermoformable, phosphorescent acrylic resin composition, further wherein said thermoformable, phosphorescent acrylic resin composition being formed by mixing said PMMA into said MMA at room temperature until said PMMA is dissolved, adding said antioxidant, air release agent, fumed silica and phosphorescent aluminate pigment, and mixing under high shear to form a thixotropic resin in which said phosphorescent aluminate pigment remains in suspension, whereby said composition is suited for use in thermoform and thermoset solid-surface acrylic resin products with a glow-in-the-dark property.

8. The thermoformable, phosphorescent acrylic resin composition according to claim 7, wherein said air release agent comprises modified urea.

* * * * *